United States Patent [19]
Andersen

[11] Patent Number: 4,804,818
[45] Date of Patent: Feb. 14, 1989

[54] COATED ELECTRODE FOR ARC WELDING

[76] Inventor: Leonard M. Andersen, 46 Alexander Ave., Yonkers, N.Y. 10704

[21] Appl. No.: 904,983

[22] Filed: Sep. 8, 1986

[51] Int. Cl.$^4$ .............................................. B23K 35/24
[52] U.S. Cl. ............................ 219/145.23; 219/146.52
[58] Field of Search ................ 219/72, 137 R, 145.23, 219/146.24, 146.3, 146.31, 146.52; 148/24–26

[56] References Cited

U.S. PATENT DOCUMENTS

| | | | |
|---|---|---|---|
| 2,544,000 | 3/1951 | Wasserman | 148/24 X |
| 2,909,648 | 10/1959 | Landis et al. | 219/145.23 X |
| 4,205,218 | 5/1980 | Fukami et al. | 219/145.23 |
| 4,220,487 | 9/1980 | Andersen | 219/146.1 X |

FOREIGN PATENT DOCUMENTS

| | | | |
|---|---|---|---|
| 2083394 | 3/1982 | United Kingdom | 219/146.52 |
| 8404716 | 12/1984 | World Int. Prop. O. | 219/145.23 |

Primary Examiner—E. A. Goldberg
Assistant Examiner—Teresa J. Walberg
Attorney, Agent, or Firm—Darby & Darby

[57] ABSTRACT

Disclosed is an electrode comprising a base rod and a hard coating, or a base wire which is coated with a powder or metallic coating of aluminum and optionally of hard coating material that adheres to the electrode and forms a partial pressure of arc activated reactive conductive gas agent in the shielding gas envelope surrounding the arc; and further acts as: an inert agent to shield volatile contaminants; a modifier of the shielding gas envelope's electrical properties; and a heat distributor in the area of the weld puddle by condensation in moisture or oil contaminated environment arc welding.

13 Claims, 1 Drawing Sheet

COATED ELECTRODE FOR ARC WELDING

BACKGROUND OF THE INVENTION

The present invention relates to an arc welding electrode having a fine powder or metallic coating which volatilizes at arc temperatures and forms a partial pressure in the resultant gas envelope that serves to neutralize volatile impurities; to improve the arc; and to distribute heat through condensation and radiant heat transfer in all forms of arc welding.

Arc welding encompasses a variety of methods for joining metals, all of which involve the use of an electric arc as a source of heat to melt and join metal. The arc is initiated and sustained between a work piece and an electrode. The electrode is then moved along the joint to be welded. The function of the electrode is to conduct a supplied current and to sustain the electric arc between the electrode's tip and the work piece. There are two types of electrodes: consumable and non-consumable. The consumable electrode is specially prepared so that it not only conducts current and sustains the arc, but it also melts and supplies filler metal to the weld site.

At present, welding in moisture or oil contaminated environments is accomplished by various means such as: preheating; isolation from the environment; electrode coating systems; shielded gas systems; flux core systems, and edges-to-be-joined coating systems. The electrode hard coating acts as a fluxing agent, which prevents, dissolves, or facilitates removal of oxides and other undesirable surface substances within limits. By creating a reducing or non-oxidizing atmosphere enveloping the arc, the electrode hard coating helps prevent contamination of the metal by oxygen, hydrogen, steam and nitrogen. Absent such a reducing atmosphere, the oxygen would readily combine with the metal causing porosity and oxidation of the weld. Reaction with nitrogen would cause brittleness, low ductility and possibly low strength and poor corrosion resistance. The electrode hard coating also facilitates arcing by insulating the sides of the electrode so that the arc is concentrated to a confined area. In addition, the electrode hard coating serves as a thermal insulator.

In other arc welding processes the shielding gas envelope of a non-oxidizing or reducing atmosphere is achieved by gas directed to the weld using an uncoated electrode (such as TIG, Tungsten Inert Gas; and MIG, Metal Inert Gas systems). Such an atmosphere can also be obtained with flux-cored welding rods. The flux produces a reducing or non-oxidizing atmosphere inside the electrode with a bare or lightly coated (copper flashing) surface. Alternatively, a submerged arc can be created with the electrode surrounded by granulated fluxing material. The fluxing material excludes air by forming liquid under which the arc is submerged.

The electrode hard coatings reduce impurities such as oxides, sulphur and phosphorous which tend to impair the deposited weld, and aid in ionization and maintenance of the arc. Electrode hard coatings provide material such as silicates, which forms a slag over the deposited weld. The slag retards heat transfer between the deposited weld and the surrounding environment and allows the deposited weld to cool and solidify slowly. The slow cooling eliminates entrapment of gases within the weld, permits solid impurities to float to the surface and has an annealing effect on the deposited weld.

There are four types of electrode hard coatings in general use. These are iron powder coatings, cellulose coatings, mineral coatings and combination of the cellulose and mineral coatings. Conventional electrode hard coatings contain some or all of cellulose, limestone fluorspar, rutile, titania, asbestos, iron powder, iron oxide, clay ferro-silicon, ferromanganese, and sodium silicate.

Specifications for electrode hard coatings are issued by the American Welding Society and American Society for Testing Materials. Suitable electrode hard coatings for use with the invention include American Welding Society AWS 3, AWS 4, AWS 6, AWS 8 designation electrode coatings. Other electrode hard coatings can be used with maintenance electrodes, non ferrous electrodes and others which do not conform to published specification.

Similar benefit in submerged arc and flux core arc welding is achieved when hard coating type material is provided as a granular surrounding material or internally in the electrode. In the case of submerged arc welding there are specifications for fluxes and wire. In case of flux cored arc welding the American Welding Society has no classification system. Fluxes generally are considered to be proprietary products.

When welding in air within contamination limits, the electrode's hard coating provides a slag deposit which coats and protects the deposited weld. However, the limits of moisture or oil contamination in field conditions are often exceeded causing inefficient welding and faulty welds. The resulting contaminant inclusion and undesirable rapid cooling of the deposited weld may cause embrittlement of the deposited weld. Thus, if adequate protection from said contaminants is not provided, the strength and ductility of welds formed in heavily moisture or oil contaminated areas, typically are lower than that obtainable in uncontaminated areas.

One object of the invention is to provide a contaminated environment welding electrode capable of producing welds of greater strength and ductility than previously possible. Another object of the present invention is to provide a contaminated environment electrode with improved heat distributing characteristics by minimizing thermal stressing and more efficiently retarding heat loss. Yet another object of the present invention is to provide a contaminated environment welding electrode with enhanced arcing capability which will allow longer and varying arc lengths equal or better than those encountered in ideal welding conditions. Still another object of the present invention is to provide a contaminated environment welding electrode which allows smoother, more efficient welding. Yet another object of the present invention is to provide a simple electrode to allow the conventional welding with less pretreatment in moisture and oil contaminated areas, enabling welders with less skill and training to function suitably. Another object of the present invention is to provide a dry powder or metallic coating on pieces to be welded which will volatilize approximate to the weld arc, imparting to the weld formed greater strength and ductility than previously possible. A further object of the present invention is to provide an electrode for welding in hyperbaric conditions.

SUMMARY OF THE INVENTION

The above and other objects are achieved by a volitalizing powder or metallic coating for consumable electrodes for use in welding in contaminated area arc welding applications. The coating comprises aluminum, and optionally, particles or other forms of hard coating material.

DETAILED DESCRIPTION

A suitable aluminum volatilizing agent is aluminum powder, such as that made by ALCOA (Aluminum Company of America, Atomized Powder No. 1401 (manufacturer's number)). Powder 1401 is supplied as a very fine dry powder. This very fine aluminum powder adheres to the electrodes in a thin uniform coating. The fine, large specific surface area aluminum powder is instantly volatilized by the heat of the arc, and forms a reactive conductive gas within the shielding gas envelope. In addition to aluminum, alloys of aluminum, magnesium, or other volatilizing metals may be used as the arc activated, volatilized reactive conductive agent. The percentage of reactive conductive aluminum gas in the shielding gas envelope should be approximately 25 to 75 percent by volume, and preferably 50 percent and its density approximately that of air. The very fine powder is applied to the hard coating of standard electrodes. This can be done optionally with a pre-coating of adhesive, as taught by Anderson, U.S. Pat. No. 4,568,813. In the case of bare or copper flashing coating electrode wire as is used in MIG (metal inert gas), submerged arc, and flux core arc welding, the aluminum coating is provided as a flashing or in the form of another type of metallic coating. In use, the electrode forms a shielding gas envelope of a partial pressure of aluminum sufficient to react with excess contamination (moisture, oil, sulfurous containing matter, etc.) but not so heavy as to be difficult to handle. This effect is pronounced in the vicinity of the arc where hard coating decomposition occurs. The surrounding arc is agitated and the shielding gas envelope becomes more reactive, enhancing the purified state of the shielding gas envelope and increasing its heat distributing capability.

Aluminum is a hard coating constituent material which is used in a homogeneous mix. In hard coatings it does not volatilize appreciably and acts primarily as a liquid. In this invention aluminum is positioned on the outside of the hard coating and in a form (fine powder) which yields appreciable volatilization and reactive conduciveness in the gas envelope. In the case of electrodes without a hard coating (wire) the rapid volitalization is achieved by the outside position of the aluminum and varying operating perimeters so that the reactive conduciveness of the gas envelope is achieved.

Heat for pre-heating and post-heating is accomplished by the luminous aluminum gas, which transfers heat to the weld site by radiant heat transfer. The aluminum gas created forms a conductive bridge between the electrode and the work piece due to the high conductivity of the aluminum gas, making arc initiation, restart and maintenance easier. Normally the binder of the hard coating and the nature of the aluminum powder's extreme state of subdivision (fineness) is sufficient to adhere the aluminum powder coating. If an adhesive layer is necessary to cause sufficient powder to adhere to the hard coating of the electrode, it is conveniently provided in the form of adhesive transfer tape. The adhesive layer must be thin enough so as not to interfere with the weld process, elastic enough to allow for spiral winding, and strong enough to retain powder in concentric layers about the electrode until consumed in the contaminated environment welding as taught by Andersen U.S. Pat. No. 4,568,813. In wire type electrodes which are bare or copper flashed, aluminum thickness can be varied in other ways.

DETAILED DESCRIPTION OF THE INVENTION

Before explaining the present invention in detail, it is to be understood that the invention is not limited in its application to the details of construction and arrangements of parts illustrated in the accompanying drawings, since the invention is capable of other embodiments and of being carried out in various other ways. Also, it is to be understood that the phraseology or terminology employed herein is the purpose of description and not limitation.

Figure 1:
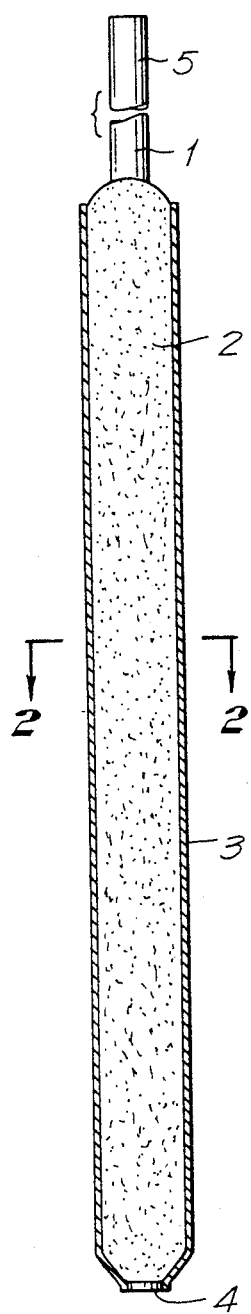
FIG. 1 is a view of a preferred hard coated electrode embodiment of the present invention.
Figure 2:
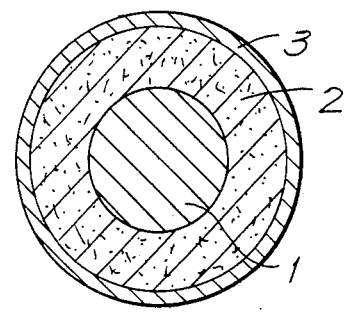
FIG. 2 is a horizontal cross-section of coated electrode of FIG. 1 showing the various layers of the electrode.

Referring now to the drawings and in particular to FIG. 1, there is shown one embodiment of the coated electrode of the present invention. To prepare the coated electrode, a suitable welding electrode having a hard coating as described above, such as a Lincoln Jetweld LH-78 electrode, or a Sandvik 310-16 electrode is obtained. The electrode comprises base metal rod 1 and hard coating layer 2 distributed evenly about the outer surface of rod 1 except for the arc tip 4 and electrode holder end 5 which are left with bare metal exposed in order to properly conduct electricity.

A dry powder comprising aluminum ALCOA (Aluminum Company of America), Atomized Powder No. 1401 (manufacturer's number), and optionally less than 1% by weight of particles of hard electrode coating material is applied to hard coating 2 and tip 4 of electrode 1. Preferably, the particle size of 90% by weight of the powder is smaller than 20 microns in average diameter. In addition, the particles are of less than 325 mesh. The powder coating is advantageously applied to the electrode with force for better adhesion so that a uniform dry powder coating 3 of approximately 1/100th inches thick is obtained on hard coating 2. Excess powder is shaken off the electrode.

Optionally 2 mil thick adhesive transfer tape (3M, manufacturer's #465) Scotch brand type, 1 inch width, is spirally wound over the hard coating about the electrode to form an adhesive layer. The tape is tightly wound about the hard coating 2 in order to impart a good adhesive film layer of the transfer tape to the hard coating of the electrode. Another layer of adhesive can be applied over the dry powder coating using the same technique which resulted in the initial adhesive layer. This process can be continued until a sufficiently thick layer of powder coating is obtained (ideally 1-3 layer). The recommended thickness of the coating, i.e. the number of layers to be applied, is dependent on such factors as rod diameter, arc obscurity, electrical current consumption, the type of hard coating used, and the type of welding technique used. This is as taught by Andersen U.S. Pat. No. 4,568,813.

Figure 3:
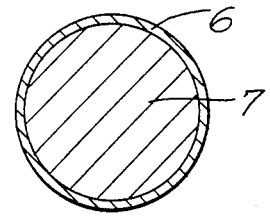
FIG. 3 is a horizontal cross-section of a MIG (metal inert gas) electrode preferred embodiment showing the various layers of the electrode.

Referring now to FIG. 3, there is shown one embodiment of the wire type electrode of the present invention. To prepare said wire electrode, a suitable wire welding electrode have a bare surface or a thin copper flashing as described above, such as Lincoln Weld Wire L-50 or Lende Ok Weld 82. The electrode comprises base metal wire 7 and a flashing or other metallic coating system i.e. spraying applied coating of aluminum 6. Said coating is approximately 2 mils thick.

The treated electrodes are conveniently packaged in normal electrode packaging or polyethylene bags and/or a Rodguard polyethylene bags and/or a Rodguard polyethylene screw top container, (manufactured by Rodguard, Inc., Buffalo, N.Y.) which serves as additional moisture barrier. The more extreme packaging is used in severe field conditions.

To use the electrode, a welder proceeds as with other welding electrodes. The initiation of the arc is facilitated by the powder coating allowing the welding to proceed with little or no preparation of the pieces to be joined. The welder can proceed with any standard welding technique. Using the electrode of the present invention, the hot stitch (hot pass) welding technique has yielded less hard (more annealed) weldment than achieved using electrodes without aluminum powder coating. For example, the "hot stitch" or "hot pass" technique involves using a ⅛" diameter electrode to form a 3/16" arc. The arc forms a puddle of molten metal whereupon the arc is depressed into the puddle approximately ⅛" to displace the slag, and weldment. A reciprocating "stitching" motion is utilized along the weld path with ¼" cycles at approximately 30 cycles/minute. Due to the electrode's stable "conductive" gas envelope arc feature, this is easily done by less skilled welders. Using this technique, the aluminum liquid and more importantly, resultant gas purifies the weldment, which needs the purification because oil and moisture contamination.

Heat created by the arc instantly vaporizes the aluminum powder coating forming a reactive conductive gas which distributes the heat by radiant heat transfer and adds heat by reaction with air. This phenomenon is known as the reactive conductive gas envelope. The conductive characteristic of the gas envelope serves to make arc manipulation and maintenance easier.

Although the invention is intended for use with consumable electrodes in contaminated environments, non consumable techniques such as gas tungsten arc welding (tungsten inert gas—TIG) may be used. The coating of the present invention can be used in a less extreme form for electrodes in all applications to increase welding efficiency.

I claim:

1. In an arc welding electrode having a conventional hard coating, for use in an arc welding process which includes an arc and a shielding gas envelope, the improvement comprising: a powder coating comprising particles of an arc activated reactive conductive agent applied to said conventional hard coating, the particles of said powder coating being less than 325 mesh and less than 20 microns in diameter, and the quantity of said powder coating applied being sufficient to yield a reactive aluminum gas envelope about the electrode, said aluminum gas being capable of reaction with impurities in weldment, providing heat during arc welding, and being electrically conductive enough to enhance arc initiation, reinitiation and stability and comprising approximately 25 to 75% by volume of the shielding gas envelope.

2. The electrode of claim 1, wherein said powder coating further comprises particles of electrode hard coating material.

3. The electrode of claim 2, wherein said electrode hard coating comprises 1% by weight of said powder coating.

4. The electrode of claim 1, wherein said arc activated reactive conductive agent is selected from the group consisting of aluminum, alloys of aluminum, and magnesium.

5. The electrode of claim 1, wherein said reactive aluminum gas comprises 50% by volume of the shielding gas envelope.

6. The electrode of claim 1, wherein said powder coating is applied to said hard coating using an acrylic, pressure-sensitive adhesive.

7. The electrode of claim 1, wherein said arc welding is by a tungsten inert gas (TIG) process and said coating is on a filler metal rod.

8. An arc welding electrode, comprising:
a base rod;
a hard coating applied to said base rod; and
at least one layer of a powder coating including particles of an arc activated volatilizing reactive conductive gas agent applied to said conventional hard coating, the particles of said powder coating being less than 325 mesh and less than 20 microns in diameter, and the quantity of said powder coating applied being sufficient to yield a reactive aluminum gas envelope about the electrode, said aluminum gas being capable of reaction with impurities in weldment, providing heat during arc welding, and being electrically conductive enough to enhance arc initiation, re-initiation and stability and comprising approximately 25 to 75% by volume of the shielding gas envelope.

9. An arc welding electrode, comprising:
a bare wire;
a powder coating including particles of an arc activated reactive conductive agent applied to said bare wire, the particles of said powder coating being less than 325 mesh and less than 20 microns in diameter, and the quantity of said powder coating applied being sufficient to yield a reactive aluminum gas envelope about the electrode, said aluminum gas being capable of reaction with impurities in weldment, providing heat during arc welding, and being electrically conductive enough to enhance arc initiation, re-initiation and stability and comprising approximately 25 to 75% by volume of the shielding gas envelope.

10. The electrode of claim 9, wherein said wire is a flux cored type.

11. The electrode of claim 9, wherein said wire is a metal inert gas (MIG) type.

12. The electrode of claim 9, wherein said arc activated reactive conductive gas agent is selected from the groups consisting of aluminum, aluminum alloys, and magnesium.

13. The electrode of claim 9, wherein said reactive aluminum gas comprises 50% by volume of the shielding gas envelope.